United States Patent
Yamada

(10) Patent No.: US 8,817,322 B2
(45) Date of Patent: Aug. 26, 2014

(54) IMAGE PROCESSING APPARATUS FOR GENERATING DISTORTION FREE IMAGE DATA WITH SCREEN ANGLE USING DITHER MATRIX

(71) Applicant: Ryuji Yamada, Ogaki (JP)

(72) Inventor: Ryuji Yamada, Ogaki (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 23 days.

(21) Appl. No.: 13/770,386

(22) Filed: Feb. 19, 2013

(65) Prior Publication Data

US 2013/0222818 A1 Aug. 29, 2013

(30) Foreign Application Priority Data

Feb. 28, 2012 (JP) ................... 2012-042225

(51) Int. Cl.
*G06K 15/00* (2006.01)
*G06F 3/12* (2006.01)
*G06K 15/02* (2006.01)

(52) U.S. Cl.
CPC .............. *G06K 15/1881* (2013.01); *G06F 3/12* (2013.01); *G06K 15/1814* (2013.01)
USPC ......... 358/1.2; 358/3.06; 358/3.11; 358/3.12; 358/3.13

(58) Field of Classification Search
CPC ....... H04N 1/52; H04N 1/407; H04N 1/4052; H04N 1/4058; G06K 15/1881; G06K 15/1885
See application file for complete search history.

(56) References Cited

U.S. PATENT DOCUMENTS

2011/0310440 A1* 12/2011 Okada et al. ................. 358/3.26

FOREIGN PATENT DOCUMENTS

| JP | 10-191050 A | 7/1998 |
| JP | 2007-097013 A | 4/2007 |
| JP | 2008-187669 A | 8/2008 |
| JP | 2009089211 * | 4/2009 |

OTHER PUBLICATIONS

Machine translation of JP Pub 2009-089211 to Ishii Koichi.*

* cited by examiner

*Primary Examiner* — Benny Q Tieu
*Assistant Examiner* — Haris Sabah
(74) *Attorney, Agent, or Firm* — Scully, Scott, Murphy & Presser, P.C.

(57) ABSTRACT

An image processing apparatus includes: a change processing unit configured to execute change processing of changing a pixel-number ratio S for distortion-free image data expressing a distortion-free image to acquire distorted image data expressing a distorted image having the pixel-number ratio of p×S; and a halftone processing unit configured to execute halftone processing for generating dot data for the distorted image data having the pixel-number ratio of p×S by using a dither matrix so as to generate distorted dot data expressing a distorted dot image having the pixel-number ratio of p×S, wherein a distortion-free dot image is to be obtained by enlarging the distorted dot data in at least the first direction, the distortion-free dot image having the pixel-number ratio S, and wherein a screen angle of the dither matrix is set to be about arctan((tan θ)/p)) when a screen angle in the distortion-free dot image is θ.

20 Claims, 12 Drawing Sheets

| 98 | 66 | 18 | 50 | 155 | 187 | 235 | 203 | 104 | 72 | 24 | 56 | 157 | 189 | 237 | 205 |
|---|---|---|---|---|---|---|---|---|---|---|---|---|---|---|---|
| 1 | 34 | 82 | 114 | 219 | 251 | 171 | 139 | 8 | 40 | 88 | 120 | 221 | 253 | 173 | 141 |
| 145 | 177 | 225 | 193 | 112 | 80 | 32 | 64 | 151 | 183 | 231 | 199 | 106 | 74 | 26 | 58 |
| 209 | 241 | 161 | 129 | 16 | 48 | 96 | 128 | 215 | 247 | 167 | 135 | 10 | 42 | 90 | 122 |
| 102 | 70 | 22 | 54 | 159 | 191 | 239 | 207 | 100 | 68 | 20 | 52 | 153 | 185 | 233 | 201 |
| 6 | 38 | 86 | 118 | 223 | 255 | 175 | 143 | 4 | 36 | 84 | 116 | 217 | 249 | 169 | 137 |
| 149 | 181 | 229 | 197 | 108 | 76 | 28 | 60 | 147 | 179 | 227 | 195 | 110 | 78 | 30 | 62 |
| 213 | 245 | 165 | 133 | 12 | 44 | 92 | 124 | 211 | 243 | 163 | 131 | 14 | 46 | 94 | 126 |

FIG. 9

|  |  |  |  | CE2 |  |  | TH2 | PM2 |  |  |  | DM2 |  |  |  |
|---|---|---|---|---|---|---|---|---|---|---|---|---|---|---|---|
| 126 | 46 | 38 | 102 | 142 | 185 | 177 | 159 | 127 | 47 | 39 | 103 | 143 | 188 | 180 | 158 |
| 86 | 6 | 14 | 54 | 198 | 254 | 247 | 167 | 87 | 7 | 15 | 55 | 199 | 255 | 246 | 166 |
| 94 | 22 | 30 | 62 | 206 | 235 | 227 | 175 | 95 | 23 | 31 | 63 | 207 | 233 | 225 | 174 |
| 110 | 78 | 70 | 118 | 147 | 219 | 211 | 131 | 111 | 79 | 71 | 119 | 145 | 217 | 209 | 129 |
| 137 | 190 | 182 | 155 | 123 | 43 | 35 | 99 | 139 | 191 | 183 | 153 | 121 | 41 | 33 | 97 |
| 193 | 249 | 243 | 163 | 83 | 3 | 11 | 51 | 195 | 251 | 241 | 161 | 81 | 1 | 9 | 49 |
| 201 | 240 | 232 | 171 | 91 | 19 | 27 | 59 | 203 | 237 | 229 | 169 | 89 | 17 | 25 | 57 |
| 152 | 224 | 216 | 136 | 107 | 75 | 67 | 115 | 149 | 221 | 213 | 133 | 105 | 73 | 65 | 113 |
| 128 | 48 | 40 | 104 | 144 | 187 | 179 | 157 | 125 | 45 | 37 | 101 | 141 | 185 | 177 | 160 |
| 88 | 8 | 16 | 56 | 200 | 255 | 245 | 165 | 85 | 5 | 13 | 53 | 197 | 253 | 248 | 168 |
| 96 | 24 | 32 | 64 | 208 | 233 | 225 | 173 | 93 | 21 | 29 | 61 | 205 | 236 | 228 | 176 |
| 112 | 80 | 72 | 120 | 145 | 217 | 209 | 129 | 109 | 77 | 69 | 117 | 148 | 220 | 212 | 132 |
| 140 | 192 | 184 | 153 | 121 | 41 | 33 | 97 | 137 | 189 | 181 | 156 | 124 | 44 | 36 | 100 |
| 196 | 252 | 241 | 161 | 81 | 2 | 9 | 49 | 193 | 249 | 244 | 164 | 84 | 4 | 12 | 52 |
| 204 | 238 | 230 | 169 | 89 | 17 | 25 | 57 | 201 | 239 | 231 | 172 | 92 | 20 | 28 | 60 |
| 150 | 222 | 214 | 134 | 105 | 73 | 65 | 113 | 151 | 223 | 215 | 135 | 108 | 76 | 68 | 116 |

SCREEN ANGLE OF DITHER MATRIX SET

SCREEN ANGLE ON PRINTED IMAGE

IMAGE PROCESSING APPARATUS FOR GENERATING DISTORTION FREE IMAGE DATA WITH SCREEN ANGLE USING DITHER MATRIX

CROSS-REFERENCE TO RELATED APPLICATIONS

This application claims priority from Japanese Patent Application No. 2012-042225 filed on Feb. 28, 2012, the entire subject matter of which is incorporated herein by reference.

TECHNICAL FIELD

The invention relates to image processing for printing image data.

BACKGROUND

There have been proposed an image processing apparatus configured to convert image data, which is expressed by multi gradations (for example, 256 gradations), into image data (for example, binary data), which is expressed by gradations that can be expressed per one pixel by using a printing material. As a result, a printing apparatus can express pseudo colors of the multi gradations over an entire area including a plurality of pixels in a printed image.

SUMMARY

Illustrative aspects of the invention provide a technology capable of reducing a throughput of image processing for printing image data.

According to one illustrative aspect of the invention, there is provided an image processing apparatus for a print execution unit that is configured to print a dot image, the image processing apparatus comprising: a processor configured to operate as: a change processing unit configured to execute change processing of changing a pixel-number ratio S of a second direction to a first direction for distortion-free image data expressing a distortion-free image having the pixel-number ratio S to acquire distorted image data expressing a distorted image having the pixel-number ratio of p×S, wherein S is more than zero and p is more than 1; and a halftone processing unit configured to execute halftone processing for generating dot data, which expresses a formation state of a dot for each pixel, on the distorted image data having the pixel-number ratio of p×S by using a dither matrix so as to generate distorted dot data expressing a distorted dot image having the pixel-number ratio of p×S. The distorted dot data is used for printing a distortion-free dot image in the print execution unit, wherein the distortion-free dot image is to be obtained by enlarging the distorted dot data in at least the first direction, the distortion-free dot image having the pixel-number ratio S. A screen angle of the dither matrix is set to be about arctan ((tan θ)/p)) when a screen angle in the distortion-free dot image is θ.

According to another illustrative aspect of the invention, there is provided an image processing apparatus for a print execution unit that is configured to print a dot image, the image processing apparatus comprising: a processor configured to operate as: a change processing unit configured to execute change processing of changing a pixel-number ratio S of a second direction to a first direction for distortion-free image data expressing a distortion-free image having the pixel-number ratio S to acquire distorted image data expressing a distorted image having the pixel-number ratio of p×S, wherein S is more than zero and p is more than 1; a halftone processing unit configured to execute halftone processing for generating dot data, which expresses a formation state of a dot for each pixel, on the distorted image data having the pixel-number ratio of p×S by using a dither matrix so as to generate distorted dot data expressing a distorted dot image having the pixel-number ratio of p×S; and an enlargement processing unit configured to execute enlargement processing for the distorted dot data to generate distortion-free dot data expressing a distortion-free dot image, the distortion-free dot image is to be obtained by enlarging the distorted dot image in at least the first direction, the distortion-free dot image having the pixel-number ratio S and comprising a plurality of sets of same lines. The set of the same lines comprises a set of two or more lines among a plurality of lines along the second direction configuring the distortion-free dot image, which two or more lines are adjacent to each other and have the same formation state of a dot of each composite pixel. The distortion-free dot data comprises compressed data expressing the set of the same lines. The compressed data comprises: representative line data expressing one representative line; and data indicating that the representative line data repeats.

BRIEF DESCRIPTION OF THE DRAWINGS

FIG. 9 shows a dither matrix of a comparative example;

DETAILED DESCRIPTION

<General Overview>

Figure 1:
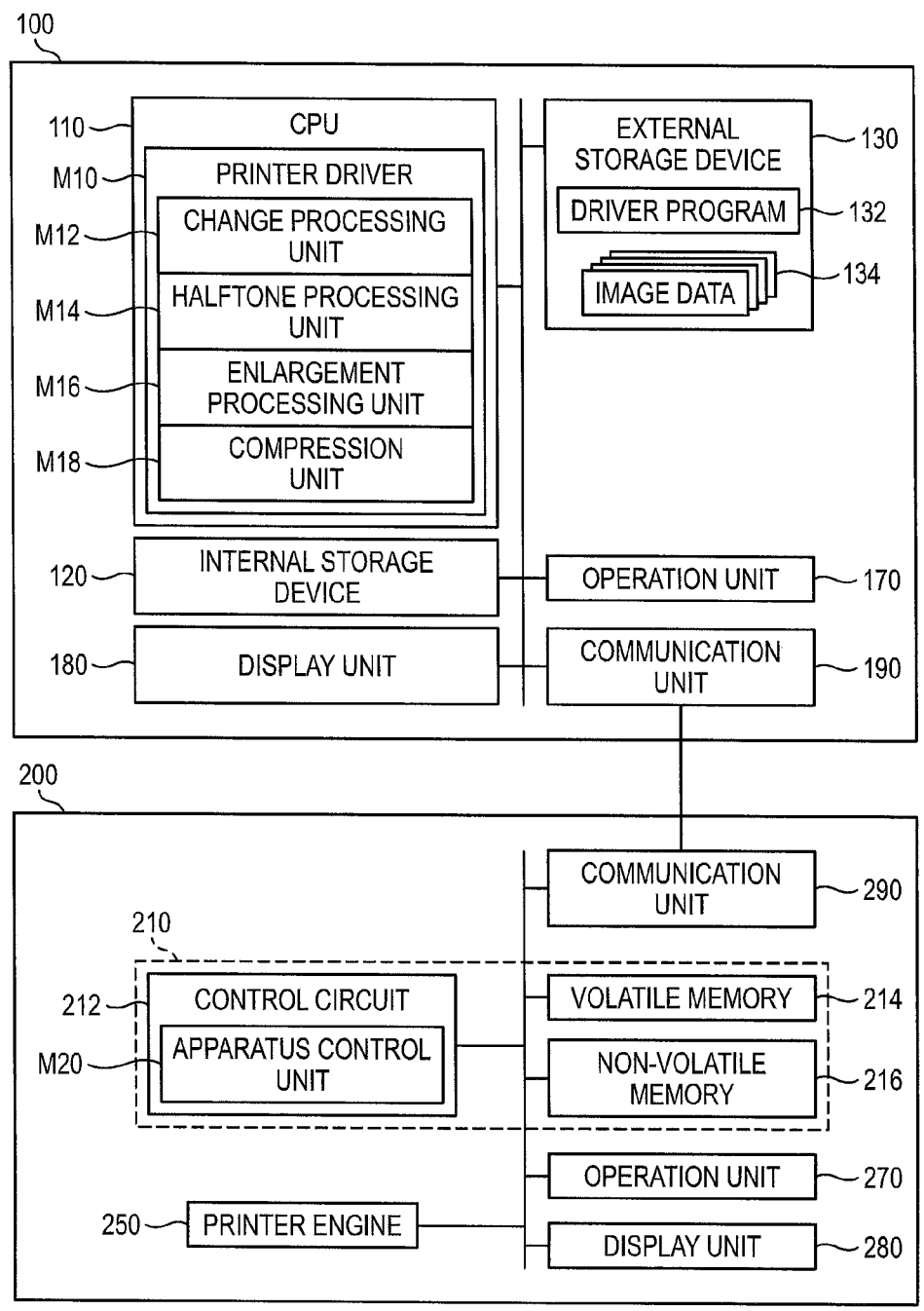
FIG. 1 is a block diagram of a computing apparatus and a printing apparatus.

There is a need for a technology of reducing a throughput of the image processing including halftone processing. If the throughput of the image processing can be reduced, it is possible to reduce processing time and resources (memory capacity, processing capacity of the processing apparatus) necessary for the processing.

Therefore, illustrative aspects of the invention provide a technology capable of reducing a throughput of image processing for printing image data.

According to a first illustrative aspect of the invention, there is provided an image processing apparatus for a print execution unit that is configured to print a dot image, the image processing apparatus comprising: a processor; and a memory having computer-readable instructions stored thereon that, when executed by the processor, cause the image processing apparatus to operate as: a change processing unit configured to execute change processing of changing a pixel-number ratio S (S>0) of a second direction to a first direction for distortion-free image data expressing a distortion-free image having the pixel-number ratio S to acquire distorted image data expressing a distorted image having the pixel-number ratio of p×S (p>1); and a halftone processing unit configured to execute halftone processing of generating dot data, which expresses a formation state of a dot for each pixel, for the distorted image data having the pixel-number ratio of p×S by using a dither matrix to generate distorted dot data expressing a distorted dot image having the pixel-number ratio of p×S, wherein the distorted dot data is configured to be enlarged in at least the first direction to be a distortion-free dot image that has the pixel-number ratio S and is used for a printing operation of the print execution unit, and wherein a screen angle of the dither matrix is set to be about $\arctan((\tan \theta)/p))$ when a screen angle in the distortion-free dot image is $\theta$.

According thereto, the halftone processing unit generates the distorted dot data, which expresses the distorted dot image having the pixel-number ratio of p×S, by using the halftone processing. The distorted dot data is an image that is obtained by enlarging the distorted dot image and is used for forming (printing) the distortion-free dot image having the pixel-number ratio S. As a result, since the halftone processing unit just has only to generate the dot data, which expresses the distorted dot image smaller than the distortion-free dot image, it is possible to reduce the throughput of the halftone processing by the halftone processing unit. Further, the screen angle appearing in the distortion-free dot image may have an influence on an image quality. According to the above configuration, since the screen angle of the dither matrix is set to be about $\arctan((\tan \theta)/p)$ when the screen angle appearing in the distortion-free dot image is $\theta$, it is possible to appropriately make the screen angle appearing in the distortion-free dot image.

According to a second illustrative aspect of the invention, in the image processing apparatus according to the first illustrative aspect, wherein the computer-readable instructions that, when executed by the processor, cause the image processing apparatus to operate as: an enlargement processing unit configured to execute enlargement processing for the distorted dot data to generate distortion-free dot data expressing the distortion-free dot image.

According thereto, it is possible to reduce the throughput of the processing for generating the distortion-free dot data.

According to a third illustrative aspect of the invention, in the image processing apparatus according to the second illustrative aspect, wherein the change processing unit is configured to execute the change processing of reducing the number of pixels in the first direction in the distortion-free image to (1/p), and wherein the enlargement processing unit is configured to execute the enlargement processing of enlarging p times the number of pixels in the first direction in the distorted dot image.

According thereto, it is possible to reduce the throughput of the processing of generating the dot data expressing the distortion-free dot image having the same number of pixels as that of the distortion-free image.

According to a fourth illustrative aspect of the invention, in the image processing apparatus according to the second illustrative aspect, wherein the change processing unit is configured to execute the change processing of enlarging p times the number of pixels in the second direction in the distortion-free image, and wherein the enlargement processing unit is configured to execute the enlargement processing of enlarging p times the number of pixels in the first direction in the distorted dot image.

According thereto, it is possible to reduce the throughput of the processing of generating the dot data expressing the distortion-free dot image that is obtained by enlarging p times the distortion-free image in the first and second directions, respectively.

According to a fifth illustrative aspect of the invention, in the image processing apparatus according to any one of the second to fourth illustrative aspects, wherein the enlargement processing unit is configured to generate the distortion-free dot data expressing the distortion-free dot image comprising a plurality of sets of same lines, wherein the set of the same lines comprises a set of two or more lines among a plurality of lines along the second direction configuring the distortion-free dot image, which two or more lines are adjacent to each other and have the same formation state of a dot of each composite pixel, wherein the distortion-free dot data comprises compressed data expressing the set of the same lines, and wherein the compressed data comprises: representative line data expressing one representative line; and data indicating that the representative line data repeats.

According thereto, it is possible to reduce a data amount of the distortion-free dot data.

According to a sixth illustrative aspect of the invention, in the image processing apparatus according to any one of the second to fourth illustrative aspects, wherein the distortion-free dot data comprises a plurality of line data corresponding to each of lines along the second direction configuring the distortion-free dot image, wherein each line data comprises pixel values indicating the formation states of dots of a plurality of pixels configuring the corresponding line, wherein the enlargement processing unit is configured to generate the distortion-free dot data such that the generated distortion-free dot data comprises a plurality of sets of same line data, wherein the set of the same line data comprises the set of the two or more line data corresponding to two or more lines adjacent to each other and having the same pixel value of the respective composite pixels, and wherein the computer-readable instructions that, when executed by the processor, cause the image processing apparatus to operate as: a compression unit configured to compress the distortion-free dot data by converting the set of the same line data into a set of representative line data, which is one line data configuring the set of the same line data, and data indicating that the representative line data repeats.

According thereto, it is possible to reduce a data amount of the distortion-free dot data.

According to a seventh illustrative aspect of the invention, in the image processing apparatus according to any one of the first to sixth illustrative aspects, wherein the dither matrix is set such that a line interval appearing in the distorted dot image becomes about $(1/p) \times D \times \cos \phi / \cos \theta$ ($\phi = \arctan((\tan \theta)/p)$) when a line interval in the distortion-free dot image is D, and wherein the line interval is an interval of a plurality of dot lines along a direction of the screen angle.

According thereto, it is possible to appropriately make lines per inch appearing in the distortion-free dot image.

According to an eighth illustrative aspect of the invention, there is provided an image processing apparatus for a print execution unit that is configured to print a dot image, the image processing apparatus comprising: a processor; and a memory having computer-readable instructions stored thereon that, when executed by the processor, cause the image processing apparatus to operate as: a change processing unit configured to execute change processing of changing a pixel-number ratio S (S>0) of a second direction to a first direction for distortion-free image data expressing a distortion-free image having the pixel-number ratio S to acquire distorted image data expressing a distorted image having the pixel-number ratio of p×S (p>1); a halftone processing unit configured to execute halftone processing of generating dot data, which expresses a formation state of a dot for each pixel, for the distorted image data having the pixel-number ratio of p×S by using a dither matrix to generate distorted dot data expressing a distorted dot image having the pixel-number ratio of p×S; and an enlargement processing unit configured to execute enlargement processing for the distorted dot data to generate distortion-free dot data expressing a distortion-free dot image, in which the distorted dot image is enlarged in at least the first direction, the distortion-free dot image having the pixel-number ratio S and comprising a plurality of sets of same lines, wherein the set of the same lines comprises a set of two or more lines among a plurality of lines along the second direction configuring the distortion-free dot image, which two or more lines are adjacent to each other and have the same formation state of a dot of each composite pixel, wherein the distortion-free dot data comprises compressed data expressing the set of the same lines, and wherein the compressed data comprises: representative line data expressing one representative line; and data indicating that the representative line data repeats.

According thereto, the distorted dot data, which expresses the distorted dot image having the pixel-number ratio of p×S, is generated using the halftone processing. The distorted dot data is used to generate the distortion-free dot data, which expresses the distortion-free dot image having the pixel-number ratio S, as an image that is obtained by enlarging the distorted dot image. As a result, since the dot data, which expresses the distorted dot image smaller than the distortion-free dot image, is generated, it is possible to reduce the throughput of the halftone processing. Further, since the distortion-free dot data includes the compressed data expressing the set of same lines, it is possible to reduce a data amount of the distortion-free dot data.

The invention can be implemented in a variety of aspects such as a method that realizes functions of the apparatus, a computer program for implementing functions of the apparatus, a recording medium having the computer program recorded therein and the like.

EXEMPLARY EMBODIMENTS

Exemplary embodiments of the invention will now be described with reference to the drawings.

(A) First Exemplary Embodiment (A-1) Configurations of Computing Apparatus 100 and Printing Apparatus 200

FIG. 1 is a block diagram of a computing apparatus 100 serving as an image processing apparatus of a first exemplary embodiment and a printing apparatus 200.

The computing apparatus 100 is a computer (for example, PC) configured to communicate with the printing apparatus 200. The computing apparatus 100 includes a CPU 110, an internal storage device 120 such as RAM, ROM and the like, an external storage device 130 such as hard disk drive and the like, an operation unit 170 such as keyboard, mouse and the like, a display unit 180 such as liquid crystal monitor and the like, and a communication unit 190 including an interface for performing communication with an external apparatus (for example, the printing apparatus 200).

The CPU 110 is configured to execute the driver program 132 to implement functions of a printer driver M10. The printer driver M10 includes a change processing unit M12, a halftone processing unit M14, an enlargement processing unit M16 and a compression unit M18 and executes image processing (which will be described later) of this exemplary embodiment.

The printing apparatus 200 includes an integrated circuit 210, a printer engine 250, an operation unit 270 such as buttons, a touch panel and the like, a display unit 280 such as liquid crystal panel and the like, and a communication unit 290 including an interface for performing communication with an external apparatus (for example, the computing apparatus 100).

The integrated circuit 210 is an ASIC (Application Specific Integrated Circuit), for example. The integrated circuit 210 includes a control circuit 212, a volatile memory 214 such as DRAM and the like, and a non-volatile memory 216 such as mask read-only memory, EEPROM and the like. The volatile memory 214 provides a buffer area that is used by the control circuit 212. The non-volatile memory 216 stores therein control data, a program and the like that are referred to by the control circuit 212. The control circuit 212 functions as an apparatus control unit M20 that is configured to overall control the printing apparatus 200. Incidentally, a part or all of the volatile memory 214 and the non-volatile memory 216 may be provided an outside of the integrated circuit 210.

The printer engine 250 is a mechanism unit configured to control the apparatus control unit M20 (integrated circuit 210) and to perform a printing operation in response to print data supplied from the apparatus control unit M20. The printer engine 250 implements a function of a monochrome laser printer that prints a dot image on a printing medium by using black toners serving as a print material. That is, the printer engine 250 is configured to implement an exposure process of exposing a photosensitive member by using laser, a developing process of attaching toners on an electrostatic latent image that is formed on the photosensitive member by the exposure process, a transfer process of transferring a developed toner image from the photosensitive member to a printing medium and a fixing process of fixing the transferred toner image on the printing medium. All of the apparatus control unit M20 and the printer engine 250 are examples of the print execution unit.

The driver program 132 configured to implement the functions of the printer driver M10 and the program configured to implement the functions of the apparatus control unit M20 may be provided with being stored in a computer-readable recording medium.

(A-2) Image Processing of Printer Driver M10

Figure 2:
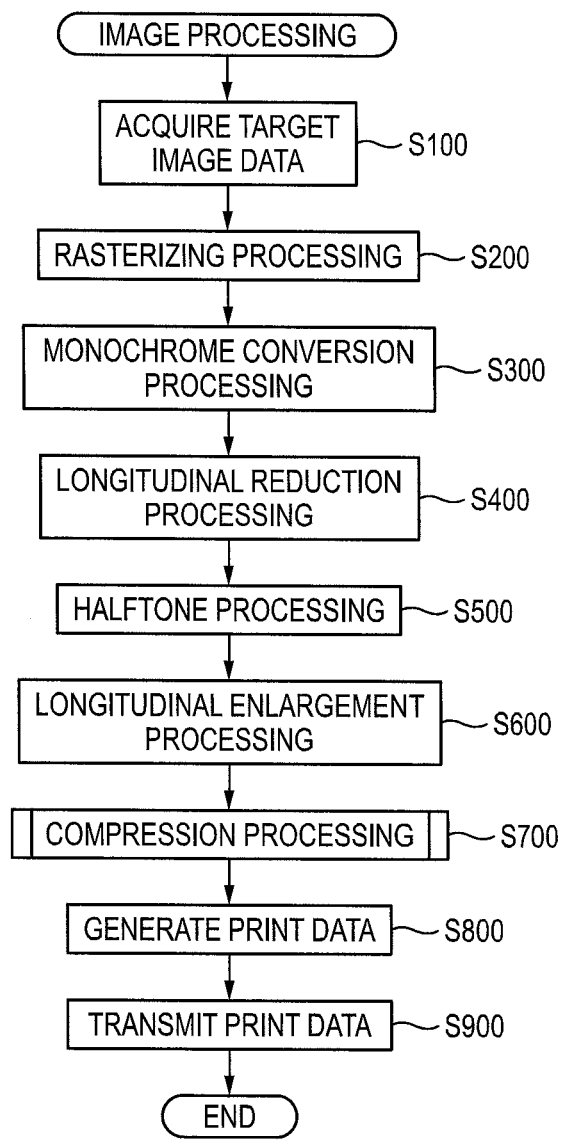
FIG. 2 is a flowchart of image processing that is executed by a printer driver.

FIG. 2 is a flowchart of image processing that is executed by the printer driver M10 of the computing apparatus 100. The image processing includes generating print data to be supplied to the printing apparatus 200 by using the image data 134. The printer driver M10 starts the image processing in response to a user's print instruction.

In step S100, the printer driver M10 acquires image data (target image data) of a processing target. The target image data is, for example, the image data 134 (refer to FIG. 1) that has been described above, and is acquired from the application program that has prepared the image data 134. The target image data has a data format that is different for each application program having prepared the image data.

In step S200, the printer driver M10 executes rasterizing processing of converting the target image data into bitmap data (RGB image data) configured by RGB image data. The RGB image data includes gradation values (256 gradation) of respective color components of RGB.

In step S300, the printer driver M10 converts the RGB image data into bitmap data (monochromatic image data) configured by monochromatic pixel data indicating a density of a black component (monochrome conversion processing). In this exemplary embodiment, the monochromatic pixel data is a gradation value in a range of 0 to 255. A gradation value '0' indicates white, a gradation value '255' indicates black, and intermediate gradation values indicate gray that has a higher density as the value is larger. Specifically, the image data acquisition unit M12 calculates a brightness value Y of the RGB pixel data, for example. The image data acquisition unit M12 converts the brightness value Y into the monochromatic pixel data by using a look-up table.

Figure 3:
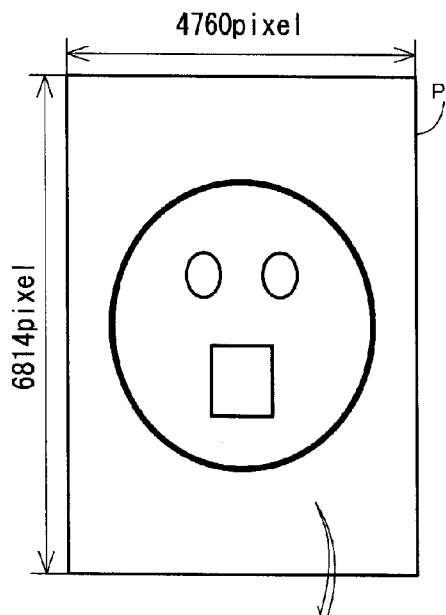
FIGS. 3(A)-3(D), collectively referenced hereinafter as FIG. 3, are conceptual views illustrating the image processing of a first exemplary embodiment.
Figure 3:
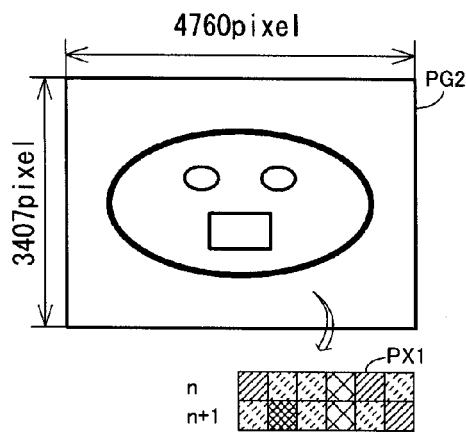
Figure 3:
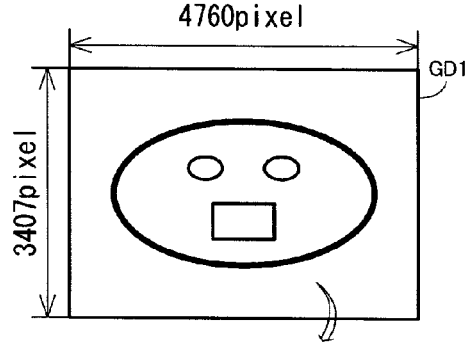
Figure 3:
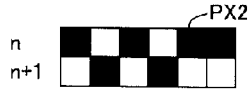
Figure 3:
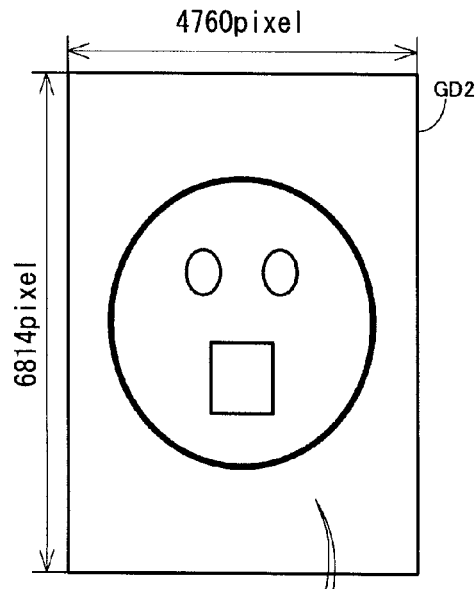
Figure 3:
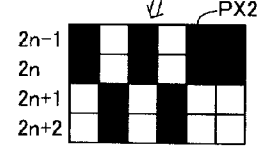

FIG. 3 is a conceptual view illustrating the image processing. FIG. 3(A) shows a monochromatic image PG1 expressed by the monochromatic image data. In this exemplary embodiment, a size (number of pixels) of the monochromatic image PG1 is 6814 pixels long×4760 pixels wide. A pixel-number ratio S of the monochromatic image PG1 is about 0.70. The pixel-number ratio S is a ratio of the number of pixels in the lateral direction to the number of pixels in the longitudinal direction.

In step S400, the change processing unit M12 of the printer driver M10 executes longitudinal reduction processing for the monochromatic image data, in which the longitudinal size of the monochromatic image PG1 is reduced to ½. By the longitudinal reduction processing, reduced monochromatic image data expressing a reduced monochromatic image PG2 is generated. FIG. 3(B) shows the reduced monochromatic image PG2.

Specifically, the change processing unit M12 deletes even line data of the monochromatic image data and acquires reduced monochromatic image data configured by only odd line data of the monochromatic image data. The even line data is a plurality of pixel data expressing a plurality of pixels configuring eventh lines (even lines) from the above of a plurality of lateral lines that configures an image (here, monochromatic image PG1) expressed by the image data. The odd line data is a plurality of pixel data expressing a plurality of pixels configuring oddth lines (odd lines) from the above of the plurality of lateral lines that configures the image expressed by the image data. Therefore, as shown in FIGS. 3(A) and 3(B), the respective pixel data expressing the respective pixels PX1 of a (2n−1)th line of the monochromatic image PG1 is the same as the respective pixel data expressing the pixels PX1 of an nth line of the reduced monochromatic image PG2. Further, the pixel data expressing the respective pixels PX1 of a (2n+1)th line of the monochromatic image PG1 is the same as the respective pixel data expressing the pixels PX1 of an (n+1)th line of the reduced monochromatic image PG2. Here, when the number of longitudinal pixels (the number of lines) of the monochromatic image PG1 is indicated by N, n is an arbitrary natural number satisfying a relation of 0<n<N/2.

Incidentally, the change processing unit M12 may generate new pixel data by using a set of the odd line pixel data and the even line pixel data of the monochromatic image data so as to acquire the reduced monochromatic image data. The set of the odd line pixel data and the even line pixel data is a set of pixel data expressing pixels of an odd line and pixel data expressing pixels (for example, pixels adjacent in a downward direction of FIG. 3) of an even line adjacent to the pixels of the odd line. For example, the change processing unit M12 may set an average value of the two pixel data configuring the set of the odd line pixel data and the even line pixel data, as the new pixel data.

As described above, the number of longitudinal pixels in the reduced monochromatic image PG2 is a half of the number of longitudinal pixels in the monochromatic image PG1 and is 3407 pixels in the example of FIG. 3(B). The number of lateral pixels in the in the reduced monochromatic image PG2 is 4760 pixels and is the same as the number of lateral pixels in the monochromatic image PG1. That is, a pixel-number ratio S2 of the reduced monochromatic image PG2 is twice as large as the pixel-number ratio S1 of the monochromatic image PG1 and is about 1.40 in the example of FIG. 3(B). Here, as shown in FIGS. 3(A) and 3(B), the reduced monochromatic image PG2 is a distorted image that is obtained by distorting the distortion-free monochromatic image PG1. In the below, the monochromatic image PG1 is also referred to as the distortion-free image PG1, and the reduced monochromatic image PG2 is also referred to as the distorted image PG2. Further, the monochromatic image data expressing the distortion-free image PG1 is also referred to as the distortion-free image data, and the reduced monochromatic image data expressing the distorted image PG2 is also referred to as the distorted image data.

In step S500, the halftone processing unit M14 of the printer engine M10 executes halftone processing for the acquired distorted image data. The halftone processing is processing of generating dot data including a formation state of a dot for each pixel by using a dither matrix DM1 (refer to FIG. 5, which will be described later). Specifically, each pixel data configuring the dot data is binary data having any one of '1' indicating that a corresponding pixel forms a dot and '0' indicating that a corresponding pixel does not form a dot. By the halftone processing of this step, distorted dot data, which expresses a distorted dot image GD1 having distortion corresponding to the distorted image PG2 (refer to FIG. 3(B)), is generated. FIG. 3(C) shows an example of the distorted dot image GD1. The number of pixels in the longitudinal direction and the number of pixels in the lateral direction in the distorted dot image GD1 are the same as those of the distorted image PG2. Therefore, the pixel-number ratio of the distorted dot image GD1 is the same as the pixel-number ratio S2 of the distorted image PG2.

In step S600, the enlargement processing unit M16 of the printer driver M10 executes dot image enlarging processing for the distorted dot data and generates distortion-free dot data expressing the distortion-free dot image GD2. FIG. 3(D) shows an example of the distortion-free dot image GD2.

Specifically, the enlargement processing unit M16 inserts copy data of nth line data between the nth line data and (n+1)th line data configuring the distorted dot data, so as to generate the distortion-free dot data. Therefore, odd line data and even line data next to the odd line data in the distortion-free dot data are the same each other. Hence, as shown in FIGS. 3(C) and 3(D), each pixel data expressing each pixel PX2 of (2n−1)th line and each pixel data expressing each pixel PX2 of 2 nth line in the distortion-free dot image GD2 expressed by the distortion-free dot data are the same data (each pixel data expressing each pixel PX2 of nth line in the distorted dot image GD1). Further, each pixel data expressing each pixel PX2 of (2n+1)th line and each pixel data expressing each pixel PX2 of (2n+2)th line in the distortion-free dot image GD2 expressed by the distortion-free dot data are the same data (each pixel data expressing each pixel PX2 of (n+1)th line in the distorted dot image GD1).

The number of longitudinal pixels in the distortion-free dot image GD2 is twice as many as the number of longitudinal pixels in the distorted dot image GD1 and the distorted image PG2 and is the same as the number of longitudinal pixels of the distortion-free image PG1 (6814 pixels). The number of lateral pixels in the distortion-free dot image GD2 is the same as the number of lateral pixels in the distorted dot image GD1, the distorted image PG2 and the distortion-free image PG1 (4760 pixels). Therefore, the pixel-number ratio of the distortion-free dot image GD2 is the same as the pixel-number ratio S of the distortion-free image PG1 and is a half of the pixel-number ratio S2 of the distorted image PG2 and the distorted dot image GD1.

Here, a set of two or more lines of a plurality of lines configuring the distortion-free dot image, which are adjacent to each other and have the same formation state (pixel value of pixel data configuring dot data) of a dot of each composite pixel, like a set of (2n−1)th line and 2 nth line of the distortion-free dot image GD2, is referred to as a set of the same lines. Further, a set of line data indicating the set of the same lines is also referred to as a set of the same line data. When the number of longitudinal pixels (the number of lines) in the distortion-free dot image GD2 is N, the distortion-free dot image GD2 includes the (N/2) sets of the same lines.

Figure 4:
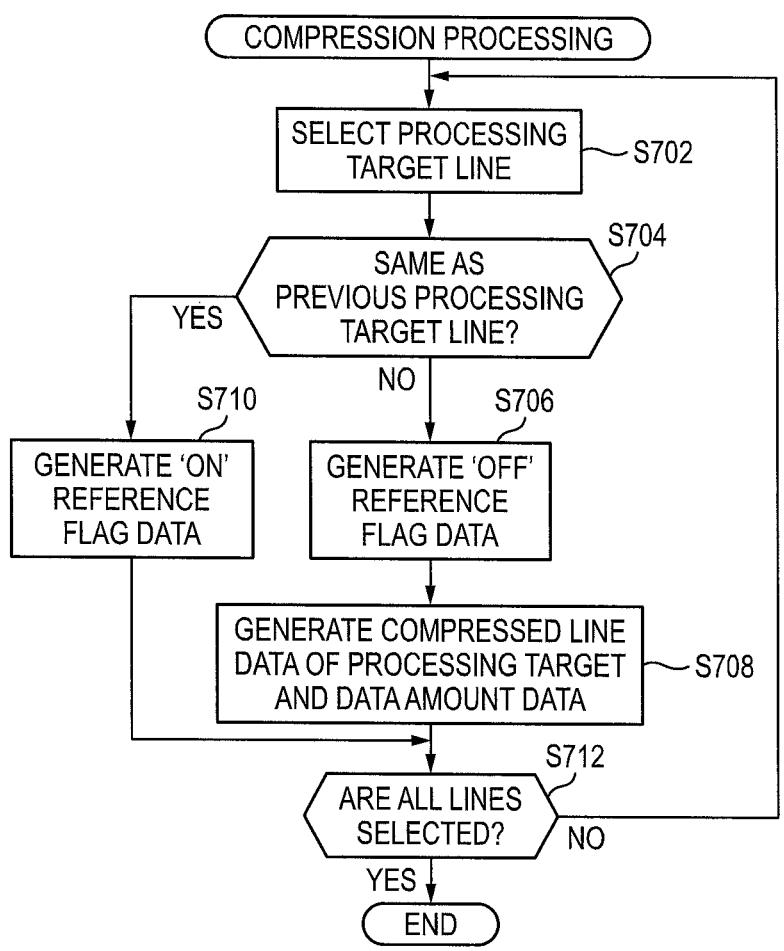
FIG. 4 is a flowchart of compression processing.
Figure 5:
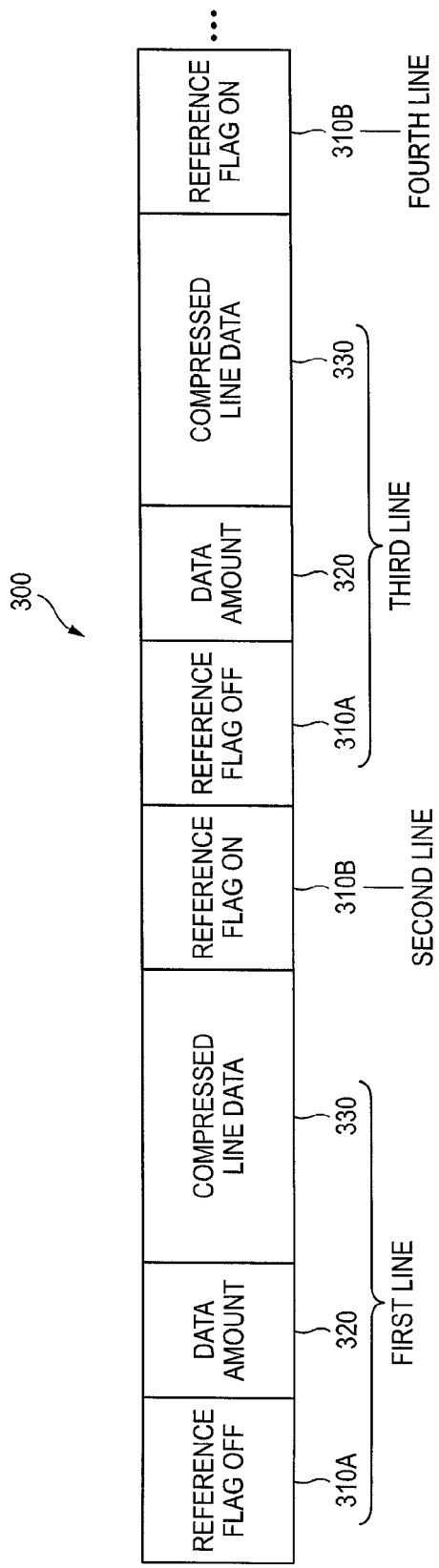
FIG. 5 is a conceptual view showing compressed dot data.

In step S700, the compression unit M18 of the printer driver M10 executes compression processing of compressing the distortion-free dot data, so as to generate compressed dot data 300. FIG. 4 is a flowchart of the compression processing. FIG. 5 is a view conceptually showing the compressed dot data 300.

In step S702, the compression unit M18 sequentially (specifically, in order from the upper in FIG. 3(D)) selects, as a processing target line, the line configuring the distortion-free dot image GD2 expressed by the distortion-free dot data that is a processing target. In step S704, the compression unit M18 determines whether the line data (processing target line data) of the processing target line is the same as the previous processing target line data. In this example, when an odd line is the processing target line, the processing target line data is not the same as the previous processing target line data. On the other hand, when an even line is the processing target line, the processing target line data is the same as the previous processing target line data.

When it is determined that the processing target line data is not the same as the previous processing target line data (S704: NO), the compression unit M18 generates reference flag data indicating an 'OFF' reference flag (step S706). In step S708, the compression unit M18 generates compressed line data and data amount data indicating a data amount of the compressed line data. The compression unit M18 compresses the processing target line data by run length compression, so as to generate the compressed line data.

When it is determined that processing target line data is the same as the previous processing target line data (S704: YES), the compression unit M18 generates reference flag data indicating an 'ON' reference flag (step S710).

In step S712, the compression unit M18 determines whether all the lines configuring the distortion-free dot image GD2, which is expressed by the distortion-free dot data that is the processing target, are selected as the processing target line. When all the lines are not selected as the processing target line (step S712: NO), the compression unit M18 returns to step S702 and repeats the processing of steps S704 to S710 while selecting a not-selected line as a new processing target line. When all the lines are selected as the processing target line (step S712: YES), the compression unit M18 ends the compression processing.

As shown in FIG. 5, the compressed dot data 300 generated by the compression processing includes data indicating each line of the distortion-free dot image GD2. The data indicating an odd line (for example, data of first and third lines, in FIG. 5) includes 'OFF' reference flag data 310A, data amount data 320 and compressed line data 330. The data indicating an even line (for example, data of second and fourth lines, in FIG. 5) includes 'ON' reference flag data 310B. The 'OFF' reference flag data 310A is a flag indicating that the data amount data 320 and the compressed line data 330 having a data amount indicated by the data amount data 320 continue from the 'OFF' reference flag data. The 'ON' reference flag data 310B is data indicating that the line indicated by the previous compressed lined data 330 repeats. Like this, when the line expressed by the same data repeats, the line data, which indicates the second line or later of the repeating lines, is replaced with the information ('ON' reference flag data 310B) indicating that the previous line data is referred to, so that the dot data is compressed. This processing is also referred to as 'pre-reference compression processing.'

As can be seen from the above descriptions, the set of the data 310A, 320, 330 indicating the odd line and the data 310B indicating the even line after the odd line is the compressed data indicating the set of the same lines and is the compressed data that is obtained by compressing the set of the same line data. It can be said that the compressed data indicating the set of the same lines includes: a set of representative line data (in this example, the data 310A, 320, 330 indicating the odd line) indicating one representative line; and the data (in this example, data 310B indicating the even line) indicating that the representative line data repeats.

In step S800 of FIG. 2, the printer driver M10 adds a variety of printer control codes and data identification codes to the generated compressed dot data 300, so as to generate print data that can be interpreted by the apparatus control unit M20 (refer to FIG. 1) of the printing apparatus 200. In step S900, the printer driver M10 transmits the generated print data to the printing apparatus 200 and ends the processing.

The apparatus control unit M20 (integrated circuit 210) of the printing apparatus 200 having received the print data stores the print data in the volatile memory 214. The apparatus control unit M20 restores the compressed dot data, which is included in the print data, by a predetermined amount (for example, by a specific number of lines), and sequentially supplies the same to the printer engine 250, so as to print the distortion-free dot image GD2.

(A-3) Dither Matrix DM1

Figures 6, 7:
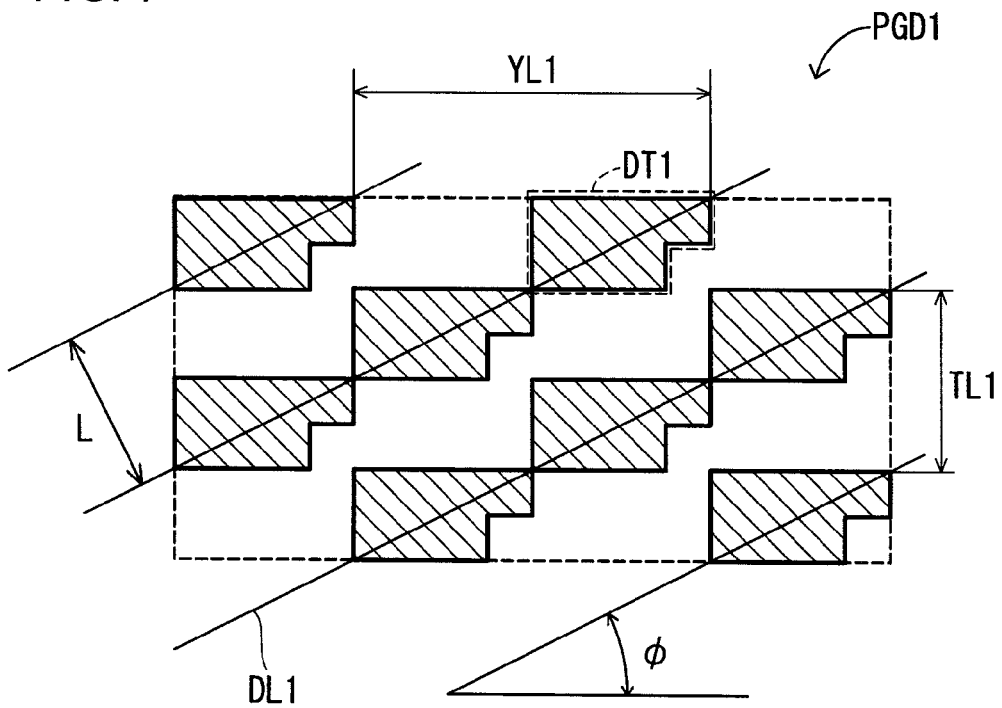
FIG. 6 shows a dither matrix.
FIG. 7 illustrates a screen angle of the dither matrix.

FIG. 6 shows the dither matrix DM1. The dither matrix DM1 is made by arranging squares PM1 corresponding to the respective pixels (refer to FIG. 3(C)) of the distorted dot image GD1 by 8 lines long×16 columns wide (128 squares in total). The dither matrix DM1 includes 8 (eight) sub-matrixes (CE1) of 2 long×4 wide. Each of the sub-matrixes includes 16 (sixteen) squares PM1 of 4 lines long×4 columns wide. Each square PM1 has a threshold TH1 defined therein. In FIG. 6, the numbers shown in the respective squares PM1 indicate the thresholds TH1 set for the respective squares PM1. In this example, the 128 thresholds TH1 are set so that they are substantially equally distributed over an entire range (for example, 0 to 255) that the gradation values to be input can take. As a result, the distorted dot image GD1, which is expressed by the distorted dot data generated using the dither matrix DM1, can express 128 gradations within the range of 8 pixels long×16 pixels wide.

FIG. 7 illustrates a screen angle of the dither matrix DM1. In a pictorial view of FIG. 7, areas corresponding to the squares PM1 having the threshold TH1 of 112 or smaller of the squares PM1 of the dither matrix DM1 are hatched and areas corresponding to the squares PM1 having the threshold TH1 of 113 or larger are white. It can be also said that FIG. 7 shows a partial distorted dot image PGD1 appearing in the distorted dot image GD1 expressed by the distorted dot data generated using the dither matrix DM1. That is, the partial distorted dot image PGD1 corresponds to the dot data in which the halftone processing has been performed for an image area of a predetermined density configured by the monochromatic pixel data having the gradation value of 112.

As can be seen from the partial distorted dot image PGD1 shown in FIG. 7, a set of dots DT1 corresponding to the sub-matrix CE1 of the dither matrix DM1 is expressed in the distorted dot image GD1. As can be seen from the solid line DL1 shown in FIG. 7, a plurality of dot lines, which is formed as a plurality of dots is connected, appears in the distorted dot image GD1. An angle of the dot line indicates a screen angle of the dither matrix DM1. In general, the screen angle $\theta$ is expressed by an angle from a three-o'clock direction (the right direction in FIG. 6) to the dot line in a counterclockwise direction. In this example, the screen angle $\theta$ is about 26.56°. The dot line is a line that is formed by a plurality of dots in accordance with a direction of the screen angle.

Figure 8:
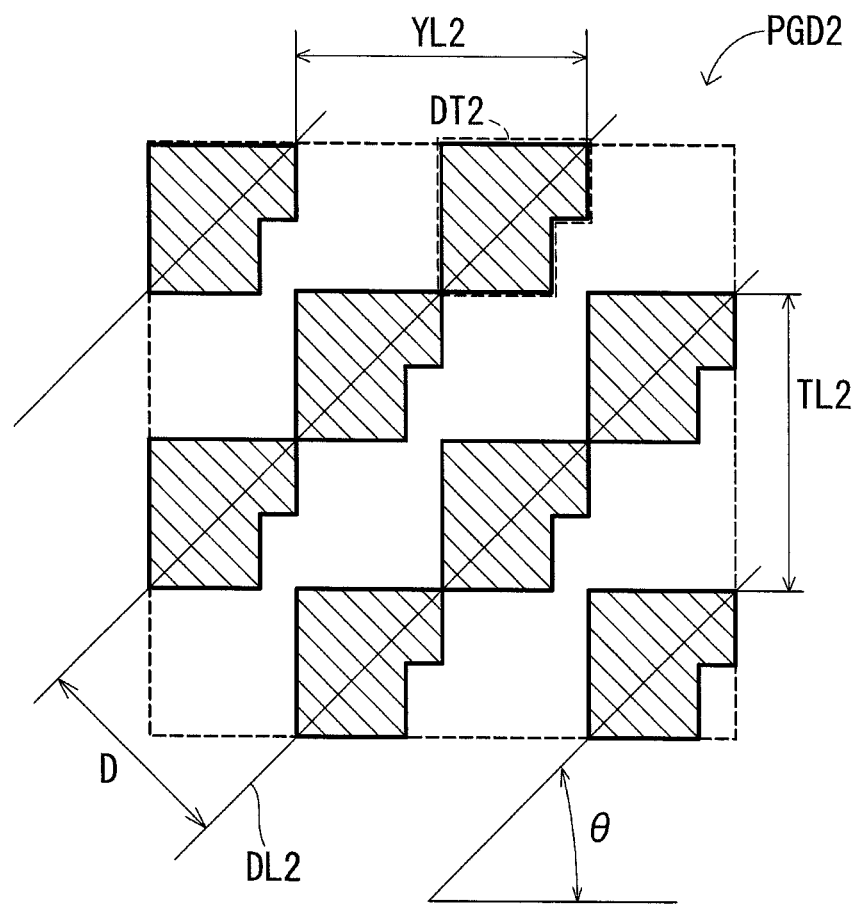
FIG. 8 illustrates a screen angle appearing in a distortion-free dot image to be printed.

FIG. 8 illustrates a screen angle that appears in the distortion-free dot image GD2 to be printed. FIG. 8 shows an area of the distortion-free dot image GD2 corresponding to the partial distorted dot image PGD1 shown in FIG. 7 (the area is also referred to as a partial distortion-free dot image PGD2).

As can be seen from the partial distortion-free dot image PGD2 shown in FIG. 8, a set of dots DT2 expressed in the distortion-free dot image GD2 is a shape that is obtained by enlarging twice the corresponding set of dots DT1 (refer to FIG. 7) expressed in the distorted dot image GD1 in the longitudinal direction. As can be seen from a solid line DL2 shown in FIG. 8, a plurality of dot lines, which is formed as a plurality of dots is connected, appears in the distortion-free dot image GD2. An angle of the dot line, e.g., a screen angle that appears in the distortion-free dot image GD2 to be printed is indicated by $\theta$. In this example, the screen angle $\theta$ is about 45°.

A tangent (tan $\phi$) of the screen angle $\phi$ (the screen angle appearing in the distorted dot image GD1) of the dither matrix DM1 is TL1/YL1. Here, TL1 indicates a longitudinal period (4 pixels (4 squares) in the example of FIG. 7) of a plurality of dot lines in the distorted dot image GD1. YL1 indicates a lateral period (8 pixels (8 squares) in the example of FIG. 7) of a plurality of dot lines in the distorted dot image GD1. A tangent (tan $\theta$) of the screen angle $\theta$ appearing in the distortion-free dot image GD2 is TL2/YL2. Here, TL2 indicates a longitudinal period (8 pixels (8 squares) in the example of FIG. 8) of a plurality of dot lines in the distortion-free dot image GD2. YL2 indicates a lateral period (8 pixels (8 squares) in the example of FIG. 8) of a plurality of dot lines in the distortion-free dot image GD2. Since TL2=2×TL1 and YL1=YL2, tan $\phi$=(tan $\theta$)/2. Therefore, it can be said that the screen angle $\theta$ of the dither matrix DM1 is set to be about arctan((tan $\theta$)/2).

A line interval L of a plurality of dot lines in the distorted dot image GD1 is expressed by cos $\phi$×TL1. Further, a line interval D of a plurality of dot lines in the distortion-free dot image GD2 is expressed by cos $\theta$×TL2. Hence, it can be said that the line interval L of the dot lines in the distorted dot image GD1 is set to be about L=(½)×D×cos $\phi$/cos $\theta$. Here, as described above, $\phi$=arctan((tan $\theta$)/2). In this exemplary embodiment, the line interval L in the distorted dot image GD1 is about 3.16 pixels, and the line interval D in the distortion-free dot image GD2 is about 5.66 pixels in which a pixel of the dot image corresponding to one square PM1 of the dither matrix DM1 is a unit.

The lines per inch (Lpi), which are determined based on the screen angle $\theta$ appearing in the distortion-free dot image GD2 to be printed or line interval D of the dot lines in the distortion-free dot image GD2, can be easily recognized by measuring the printed distortion-free dot image GD2 with a known screen gauge.

According to the exemplary embodiment as described above, the halftone processing unit M14 generates the distorted dot data, which expresses the distorted dot image GD1 having the pixel-number ratio S2 twice as large as the pixel-number ratio S of the distortion-free image PG1, by using the dither matrix. Then, the enlargement processing unit M16 executes the enlargement processing for the distorted dot data and generates the distortion-free dot data expressing the distortion-free dot image GD2. As a result, the halftone processing unit M14 just has only to generate the distorted dot data, which expresses the distorted dot image GD1 smaller than the distortion-free dot image GD2. According thereto, it is possible to reduce the throughput of the halftone processing.

More specifically, the change processing unit M12 executes the change processing of reducing the number of longitudinal pixels of the distortion-free image PG1 to a half (½) and generates the distorted image data expressing the distorted image PG2. Then, the enlargement processing unit M16 converts the distorted image data into the distorted dot data and then executes the enlargement processing of enlarging twice the number of longitudinal pixels of the distortion dot image GD1. As a result, it is possible to reduce the throughput of the processing of generating the distortion-free dot data, which expresses the distortion-free dot image GD2 having the same number of pixels as that of the distortion-free image PG1, to a substantial half.

Further, according to the above-described exemplary embodiment, since the compression unit M19 compresses the distortion-free dot data, which expresses the distortion-free dot image GD2 including the set of the same lines, by using the pre-reference compression processing (refer to FIG. 4), it is possible to reduce the data amount of the distortion-free dot data. Hence, it is possible to reduce the data amount of the print data that is transmitted to the printing apparatus 200. As a result, it is possible to reduce a memory capacity (for example, a capacity of the volatile memory 214) that is required for the printing apparatus 200.

Here, the screen angle appearing in the printed image, e.g., the screen angle appearing in the distortion-free dot image GD2 (partial distortion-free dot image PGD2 (refer to FIG. 8)) in this exemplary embodiment affects the image quality. For example, regarding the human visual features, it has been known that the resolution is high for longitudinal and lateral stripe patterns and is low for an oblique stripe pattern is known. Thus, the longitudinal and lateral stripe patterns are apt to be conspicuous and the oblique stripe pattern is not conspicuous well. Taking into consideration the human visual features, the screen angle appearing in the printed image is generally set to be 45° in the monochrome printing. According to the above configuration, the screen angle $\phi$ of the dither matrix DM1 is set to be $\phi$=arctan((tan $\theta$)/2), so that the screen angle appearing in the distortion-free dot image GD2 (partial distortion-free dot image PGD2 (FIG. 8)) becomes the target value $\theta$. Specifically, the screen angle $\phi$ of the dither matrix DM1 is set to be about 26.56°, so that the screen angle appearing in the distortion-free dot image GD2 (partial distortion-free dot image PGD2 (FIG. 8)) becomes about 45°. As a result, it is possible to improve the image quality of the printed image by adjusting the screen angle appearing in the printed image, e.g., the distortion-free dot image GD2.

The lines per inch (lpi) in the printed image, e.g., in this exemplary embodiment, the lines per inch in the distortion-free dot image GD2 (partial distortion-free dot image PGD2 (FIG. 8)) affects the image quality. For example, when the lines per inch are small, a size (corresponding to the sub-matrix CE1 (FIG. 6)) of the set of the dots adjacent to each other is increased, so that the stability of toner is improved and a defect such as banding is difficult to occur. However, when the lines per inch are small, an image becomes rough and the backlash of the edge is increased. Thus, considering the merits and weak points, the proper lines per inch are determined. The lines per inch in the distortion-free dot image GD2 (partial distortion-free dot image PGD2 (FIG. 8)) are determined by the line interval D. According to the above configuration, in the dither matrix DM1, the line interval L appearing in the distorted dot image GD1 (partial distorted dot image PGD1 (FIG. 7)) is set to be about $(½) \times D \times \cos \phi / \cos \theta$ ($\phi = \arctan((\tan \theta)/2)$), so that the line interval appearing in the distortion-free dot image GD2 (partial distortion-free dot image PGD2 (FIG. 8)) becomes the target value D. As a result, it is possible to improve the image quality of the printed image by adjusting the line interval D appearing in the distortion-free dot image GD2 and the lines per inch determined by the line interval D.

FIG. 9 shows a dither matrix DM2 of a comparative example. The dither matrix DM2 is an example of the dither matrix that is used for generating the general dot data. That is, the dither matrix DM2 is a dither matrix that is used for the image processing of executing the halftone processing for distortion-free image data, which expresses a distortion-free image, to generate distortion-free dot data expressing a distortion-free dot image and generating print data expressing the distortion-free dot image.

The dither matrix DM2 is configured by arranging squares PM2 by 16 lines long×16 columns wide (256 squares in total). The dither matrix DM2 includes 8 (eight) sub-matrixes (CE2) of 2 long×4 wide. Each of the sub-matrixes includes 32 (thirty two) squares PM2 of 8 lines long×4 columns wide. In this example, the 256 threshold values TH2 are set to be one of 0 to 255 that the gradation values to be input can take. As a result, a dot image that is expressed by the dot data generated using the dither matrix DM2 can express 256 gradations within a range of 16 pixels long×16 pixels wide. When the dither matrix DM2 is used for generation of the general dot data, it is possible to implement the target value (45°) of the printed image screen angle θ and the target value (5.66 pixels) of the line interval D in the above exemplary embodiment.

However, when the dither matrix DM2 is used in the image processing of the above-described exemplary embodiment instead of the dither matrix DM1 (FIG. 6), the screen angle θ4 and the line interval D4 of the obtained printed image (distortion-free dot image GD2) have the different values from the target values (45°, 5.66 pixels).

Figure 10:
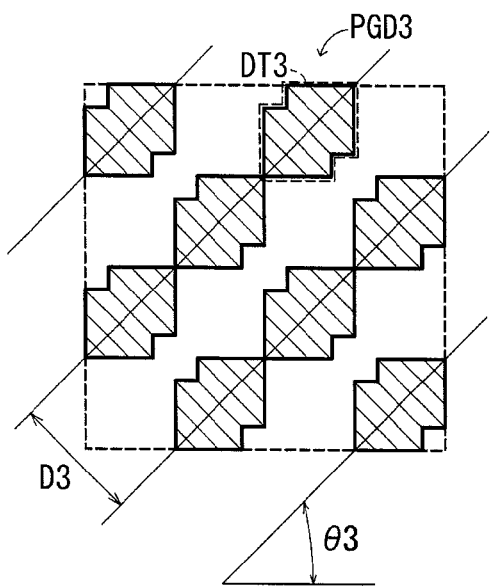
FIGS. 10(A)-10(B), collectively referenced hereinafter as FIG. 10, illustrate a dot image that is formed when the dither matrix of the comparative example is used.
Figure 10:
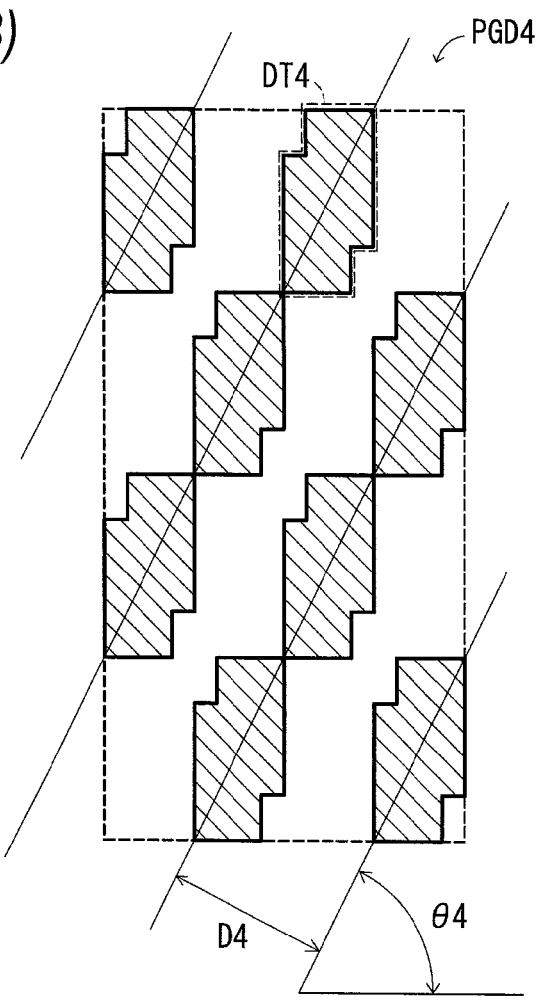

FIG. 10 shows dot images that are obtained using the dither matrix DM2 of the comparative example. FIG. 10(A) is a view where areas corresponding to the squares PM2 having the threshold TH2 of 112 or smaller of the squares PM2 of the dither matrix DM2 are hatched, and areas corresponding to the squares PM2 having the threshold TH1 of 113 or larger are white. It can be also said that FIG. 10 shows a partial distorted dot image PGD3 appearing in the distorted dot image GD3 (not shown) expressed by the dot data generated using the dither matrix DM2. FIG. 10(B) shows a distortion-free dot image GD4 (partial distortion-free dot image PGD4) that is obtained by enlarging the distorted dot image GD3 in the longitudinal direction, e.g., a printed image.

As can be seen from the partial distorted dot image PGD3 (FIG. 10(A)), a plurality of dot lines, which is formed as a plurality of dots DT3 is connected, appears in the distorted dot image GD3 generated using the dither matrix DM2. As shown in FIG. 10(A), when the dither matrix DM2 of the comparative example is used, the screen angle θ3 and the line interval D3 appearing in the distorted dot image GD3 before the enlargement have the target values (45°, 5.66 pixels), respectively. Therefore, as can be seen from the partial distortion-free dot image PGD4 (FIG. 10(B)), the screen angle θ4 and the line interval D4 appearing in the distortion-free dot image GD4 after the enlargement have the different values (about 63.45°, 7.15 pixels) from the target values. As a result, a quality of the printed image may be deteriorated.

In the above exemplary embodiment, the dither matrix DM1 of FIG. 6 is used. Thereby, it is possible to appropriately make the screen angle θ and the line interval D appearing in the distortion-free dot image GD2, and to improve the quality of the printed image, compared to the comparative example where the dither matrix DM2 of FIG. 9 is used.

(B) Second Exemplary Embodiment

A second exemplary embodiment of the invention will now be described. Incidentally, the second exemplary embodiment is the same as the first exemplary embodiment except for parts of the image processing. Thus, the different points will be described.

Figure 11:
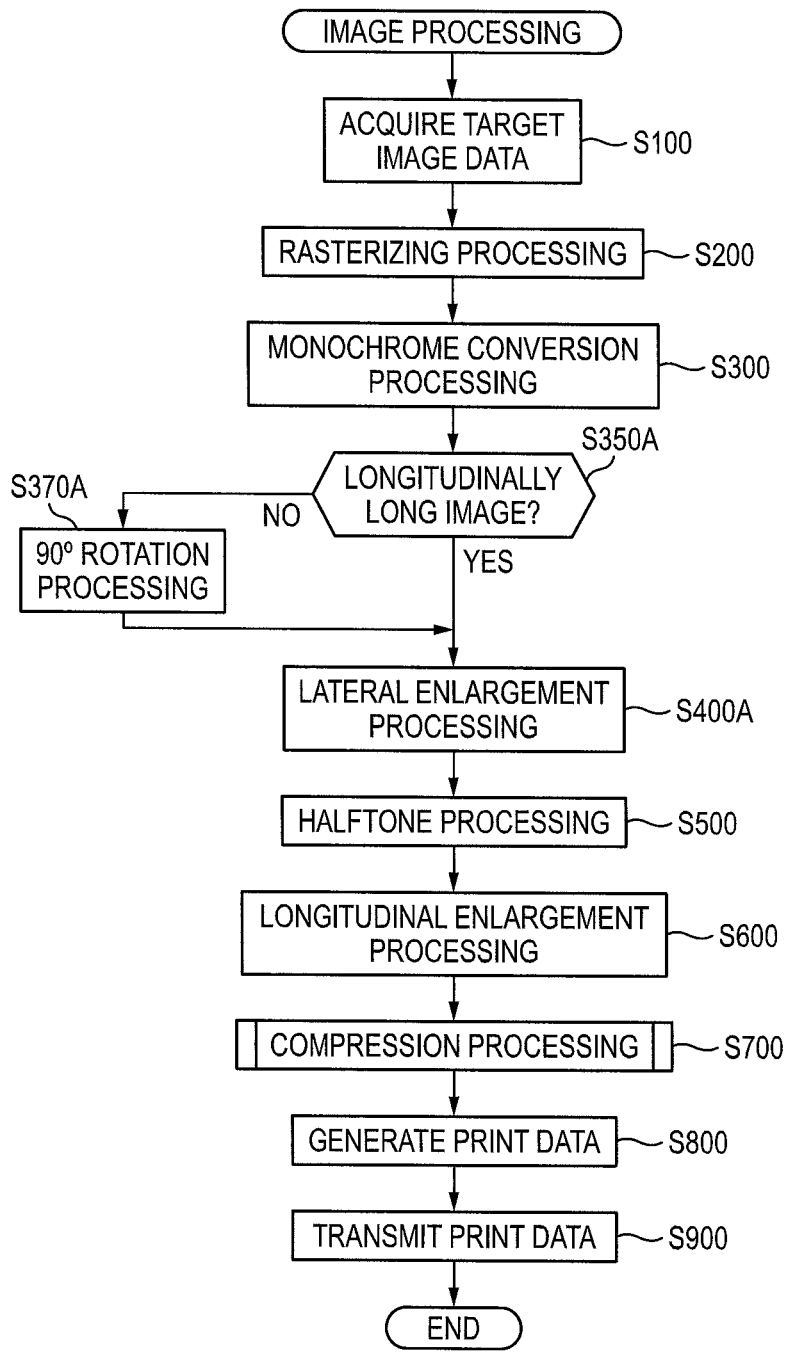
FIG. 11 is a flowchart of image processing of a second exemplary embodiment.
Figure 12:
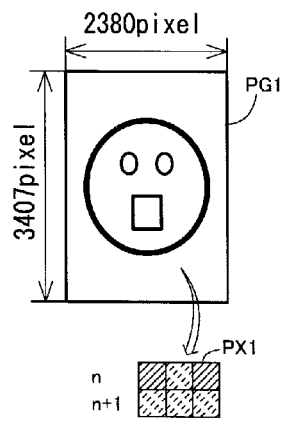
FIGS. 12(A)-12(D), collectively referenced hereinafter as FIG. 12, are conceptual views illustrating the image processing of the second exemplary embodiment.
Figure 12:
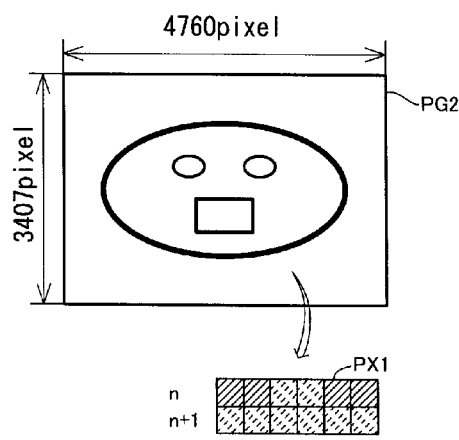
Figure 12:
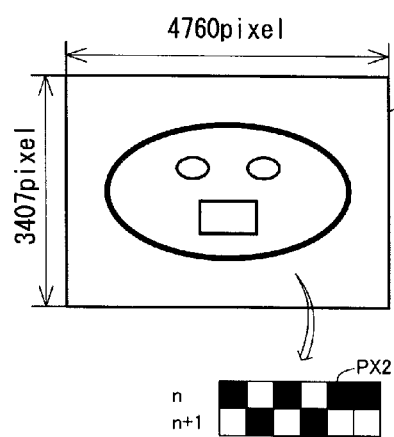
Figure 12:
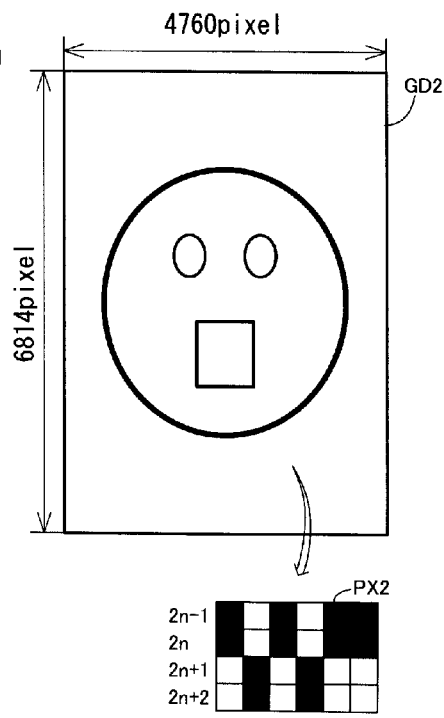

FIG. 11 is a flowchart of image processing of the second exemplary embodiment. FIG. 12 is a conceptual view illustrating the image processing of the second exemplary embodiment. In FIGS. 12(A) to 12(D), the distortion-free image PG1, the distorted image PG2, the distorted dot image GD1 and the distortion-free dot image GD2 of the second exemplary embodiment are respectively shown, like FIG. 3 used for the descriptions of the first exemplary embodiment. In FIG. 11, the same steps as those of the image processing (FIG. 2) of the first exemplary embodiment are indicated with the same reference numerals as FIG. 2, and the different steps from those of the image processing of the first exemplary embodiment are indicated with the same reference numerals having 'A' attached thereto.

In the image processing of the second exemplary embodiment, the same steps S100 to S300 as those of the image processing of the first exemplary embodiment are executed, and the distortion-free image data expressing the distortion-free image PG1 is prepared. In a subsequent step S350A, the printer driver M10 determines whether the distortion-free image PG1 is a longitudinally long image, e.g., whether the pixel-number ratio S of the number of pixels in the lateral direction to the number of pixels in the longitudinal direction is smaller than 1. When it is determined that the distortion-free image PG1 is not a longitudinally long image (step S350A: NO), the printer driver M10 executes rotation processing of rotating the distortion-free image PG1 by 90° and generates distortion-free image data expressing a longitudinally long distortion-free image PG1 (step S370A). When it is determined that the distortion-free image PG1 is a longitudinally long image (step S350A: YES), the printer driver M10 proceeds to processing of step S400A.

In the second exemplary embodiment, the number of pixels of the distortion-free image PG1 (distortion-free image PG1 after the rotation processing when the 90° rotation processing is performed) is 3407 pixels long×2380 pixels wide. That is, the number of longitudinal pixels and the number of lateral pixels in the distortion-free image PG1 of the second exemplary embodiment are halves of the number of longitudinal pixels and the number of lateral pixels in the distortion-free image PG1 of the first exemplary embodiment. The pixel-number ratio S of the distortion-free image PG1 of the second exemplary embodiment is the same as the pixel-number ratio S of the distortion-free image PG1 of the first exemplary embodiment and is about 0.70.

In step S400A, the change processing unit M12 of the printer driver M10 executes lateral enlargement processing of enlarging twice a lateral size of the distortion-free image PG1 for the distortion-free image data. By the lateral enlargement processing, distorted image data expressing a distorted image PG2 (FIG. 12(B)) is generated.

Specifically, the change processing unit M12 generates the distorted image data such that the same column as an mth column is arranged between the mth column (pixel column) and a (m+1)th column along the longitudinal direction configuring the distortion-free image PG1. Thus, in the distorted image data, the odd column data indicating an odd column and the even column data indicating an even column after the odd column are the same.

Incidentally, the change processing unit M12 may generate pixel data of a new column, which is inserted between the mth column and the (m+1)th column, by using a set of pixel data configuring the mth column of the distortion-free image data and pixel data configuring the (m+1)th column adjacent to the pixel in the lateral direction to acquire the distorted image data. For example, the change processing unit M12 may set an average value of the two pixel data configuring the set of the pixel data, as new pixel data.

As described above, the number of lateral pixels of the distorted image PG2 (FIG. 12(B)) of the second exemplary embodiment is twice as many as the number of lateral pixels of the distortion-free image PG1 of the second exemplary embodiment and is 4760 pixels in the example of FIG. 12(B). As a result, the distorted image PG2 of the second exemplary embodiment has the same size (number of pixels) as the distorted image PG2 (FIG. 3(B)) of the first exemplary embodiment. That is, the pixel-number ratio S2 of the distorted image PG2 of the second exemplary embodiment is twice as large as the pixel-number ratio S of the distorted image PG1 of the first exemplary embodiment and is about 1.40 in the example of FIG. 12(B).

The processing of subsequent steps S500 to S900 is the same as that of the image processing (FIG. 2) of the first exemplary embodiment. As a result of the processing of these steps, the print data for printing the distortion-free dot image GD2 (FIG. 12(D)) is transmitted to the printing apparatus 200.

According to the second exemplary embodiment as described above, it is possible to reduce the throughput of the processing of generating the dot data expressing the distortion-free dot image GD2 in which the size (the number of pixels) of the distortion-free image PG1 is enlarged twice (the number of pixels is increased) in the longitudinal and lateral directions, respectively.

(C) Modified Exemplary Embodiments (C-1) In the above-described exemplary embodiments, the print data for monochrome printing is generated. Alternatively, the print data for color printing may be generated. In this case, in step S300 (FIG. 2), the printer driver M10 converts RGB data into bitmap data (CMYK image data) configured by CMYK pixel data expressing a set (specifically, a set of gradation values of CMYK) of gradation values of color components corresponding to printing materials (specifically, CMYK toners) that are used for color printing (color conversion processing). The number of gradations of the color components of the CMYK pixel data is 256 gradations, for example. Specifically, the printer driver M10 executes the color conversion processing by using a profile in which a corresponding relation between RGB pixel data and CMYK pixel data is defined, specifically, a look-up table.

In step S400 (FIG. 2), the change processing unit M12 generates CMYK image data expressing the distorted image PG2. In step S500, the halftone processing unit M14 generates distorted dot data expressing the distorted dot image GD1 of the respective color components of CMYK (halftone processing). In step S600, the enlargement processing unit M16 generates distortion-free dot data expressing the distortion-free dot image GD2 of the respective color components of CMYK.

Figure 13:
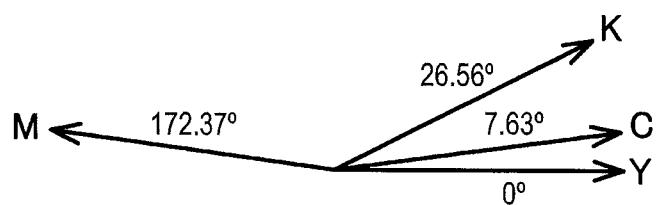
FIGS. 13(A)-13(B), collectively referenced hereinafter as FIG. 13, illustrate a dither matrix set of a modified exemplary embodiment.
Figure 13:
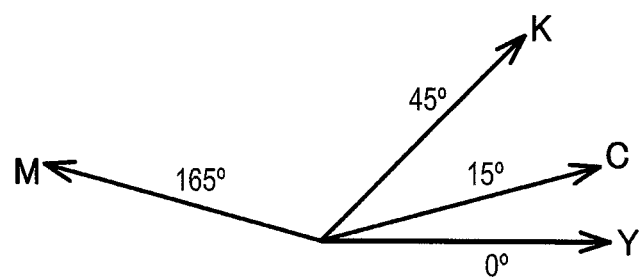

FIG. 13 illustrates a dither matrix set that is used for the halftone processing of this modified exemplary embodiment. FIG. 13(A) shows screen angles of the dither matrix set of this modified exemplary embodiment. FIG. 13(B) shows screen angles appearing in a printed image (distortion-free dot image GD2) of this modified exemplary embodiment. The dither matrix set is a set of dither matrixes of respective colors of CMYK. The screen angles ($\phi c$, $\phi m$, $\phi y$, $\phi k$) of the respective dither matrixes of CMYK are set to be $\phi f$ (=arctan((tan $\theta f$)/2)) (f is one of c, m, y and k) such that the screen angles appearing in the printed image (distortion-free dot image GD2) become the target value ($\theta c$, $\theta m$, $\theta y$, $\theta k$).

The target values ($\theta c$, $\theta m$, $\theta y$, $\theta k$) of the screen angles appearing in the printed image (distortion-free dot image GD2) are set with an appropriate combination avoiding an occurrence of a moiré. For example, it is set so that $\theta c$, $\theta m$, $\theta y$, $\theta k$=15°, 165°, 0°, 45° (FIG. 13(B)). In this case, the screen angles ($\phi c$, $\phi m$, $\phi y$, $\phi k$) of the respective dither matrixes of CMYK are set to be (7.63°, 172.32°, 0°, 26.56°) (FIG. 13(A)).

Likewise, when the target values of the line intervals of the respective colors of CMYK appearing in the printed image (distortion-free dot image GD2) are (Dc, Dm, Dy, Dk), the respective dither matrixes of CMYK are set such that the line intervals (Lc. Lm, Ly, Lk) of the respective colors of CMYK appearing in the distorted dot image GD1 become about ($\frac{1}{2}$)×Df×cos $\phi f$/cos $\theta f$ ($\phi f$=arctan((tan $\theta f$/2) (f is one of c, m, y and k). As a result, it is possible to improve the quality of the color printed image.

(C-2) In the image processing of the above-described exemplary embodiments, the longitudinal reduction processing (FIG. 2: step S400) of reducing the number of longitudinal pixels in the distortion-free image PG1 to a half is executed as the change processing of acquiring the distorted image data expressing the distorted image PG2 having the changed pixel-number ratio S of the distortion-free image PG1. Further, the longitudinal enlargement processing (FIG. 2: step S600) of enlarging twice the number of longitudinal pixels in the distorted dot image GD1 is executed as the enlargement processing of generating the distortion-free dot data expressing the distortion-free dot image GD2 that is obtained by enlarging the distorted dot image in at least one direction. The combination of the change processing and the enlargement processing is not limited thereto. The processing of reducing the number of longitudinal pixels in the distortion-free image PG1 to ⅓ or ¼ may be executed as the change processing, and the processing of enlarging threefold or fourfold the number of longitudinal pixels in the distorted dot image GD1 may be executed as the enlargement processing. Further, the processing of enlarging threefold or fourfold the number of lateral pixels in the distortion-free image PG1 may be executed as the change processing and the processing of enlarging threefold or fourfold the number of longitudinal pixels in the distorted dot image GD1 may be executed as the enlargement processing. To the contrary, the processing of enlarging threefold or fourfold the number of longitudinal pixels in the distortion-free image PG1 may be executed as the change processing and the processing of enlarging threefold or fourfold the number of lateral pixels in the distorted dot image GD1 may be executed as the enlargement processing.

Generally, the change processing may be processing of executing the change processing of changing the pixel-number ratio S for the distortion-free image data expressing the distortion-free image PG1 having the pixel-number ratio S (S>0) of a second direction (for example, lateral direction intersecting with the longitudinal direction) to a first direction (for example, longitudinal direction) and thus acquiring the distorted image data expressing the distorted image having a pixel-number ratio p×S (p>1). The corresponding enlargement processing may be processing of enlarging the distorted dot image GD1 having the pixel-number ratio p×S in at least the first direction and thus generating the distortion-free dot data expressing the distortion-free dot image GD2 having the pixel-number ratio S. In this case, the screen angle θ of the dither matrix DM1 is preferably set to be about arctan((tan θ)/p) such that the screen angle appearing in the distortion-free dot image GD2 becomes the target value θ. Further, the dither matrix DM1 is preferably set such that the line interval L appearing in the distorted dot image GD1 becomes about (1/p)×D×cos φ/cos θ(φ=arctan((tan θ)/p)) so as for the line interval appearing in the distortion-free dot image GD2 to be the target value D.

(C-3) In the above-described modified exemplary embodiment (2), the screen angle φ of the dither matrix DM1 is preferably set to be arctan((tan θ)/p). However, the screen angle is not necessarily strictly set and may be set to be substantial arctan((tan θ)/p). For example, the screen angle φ of the dither matrix DM1 is preferably an angle that is close to arctan((tan θ)/p) of θ and arctan((tan θ)/p). Alternatively, when φs=arctan((tan θ)/p), the screen angle φ of the dither matrix DM1 is preferably within a range of 0.6×φs<φ<1.4×φs, and more preferably within a range of 0.9×φs<φ<1.1×φs.

Likewise, the line interval L appearing in the distorted dot image GD1 is preferably set to be about (1/p)×D×cos φ/cos θ(φ=arctan((tan θ)/p)). For example, the line interval L appearing in the distorted dot image GD1 is preferably a value that is close to (1/p)×D×cos φ/cos θ of D and (1/p)×D×cos φ/cos θ. Alternatively, when Ls=(1/p)×D×cos φ/cos θ, the line interval L appearing in the distorted dot image GD1 is preferably within a range of 0.6×Ls<L<1.4×Ls, and more preferably within a range of 0.9×Ls<L<1.1×Ls.

(C-4) In the above-described exemplary embodiments, after the change processing unit M12 generates (acquires) the whole distorted image data (FIG. 2: step S400), the halftone processing unit M14 executes the halftone processing for the distorted image data to generate the distorted dot data (FIG. 2: step S500). Alternatively, the processing that the halftone processing unit M14 converts the pixel data into binary data whenever the change processing unit M12 acquires the pixel data configuring the distorted image data may be repeated as the number of pixels. That is, the acquisition of the distorted image data by the change processing unit M12 and the generation of the distorted dot data by the halftone processing unit M14 may be repeated in a pixel unit and the distorted dot data may be thus generated from the distortion-free image data.

(C-5) In the above-described exemplary embodiments, after the enlargement processing unit M16 generates the not-compressed distortion-free dot data, the compression unit M18 compresses the distortion-free dot data to generate the compressed dot data 300 (FIG. 5). Alternatively, the enlargement processing unit M16 may generate the compressed dot data 300 by using the distorted dot data, without generating the not-compressed distortion-free dot data. Specifically, the enlargement processing unit M16 may compress the respective line data included in the distorted dot data and add the even line data 310B (ON reference flag data) just after the odd line data, whenever the odd line data 310A, 320, 330 is generated in the distortion-free dot data. The enlargement processing unit M16 may repeat the corresponding processing for all line data included in the distorted dot data and generate the compressed dot data 300 that is the compressed distortion-free dot data, without generating the not-compressed distortion-free dot data. That is, the enlargement processing unit M16 may generate the distortion-free dot data (compressed dot data 300), which includes the compressed data expressing the set of the same lines, by using the distorted dot data.

(C-6) In the above-described exemplary embodiments, the steps S600 and S700 may be omitted and the distorted dot data generated in S500 may be supplied to the printing apparatus 200 as the print data. In this case, the apparatus control unit M20 of the printing apparatus 200 may generate the distortion-free dot data by using the distorted dot data and supply the generated distortion-free dot data to the printer engine 250. By doing so, the printing apparatus 200 can print the distortion-free dot image GD2 that is expressed by the distortion-free dot data, like the above-described exemplary embodiments. Generally, it is preferable to configure such that the printer driver M10 includes the halftone processing unit M14 configured to generate the distorted dot data expressing the distorted dot image GD1, and the generated distorted dot data is used for the print execution unit (for example, the printer engine 250 and the apparatus control unit M20 of the printing apparatus 200) to print the distortion-free dot image GD2, which is obtained by enlarging the distorted dot image GD1.

(C-7) The respective functional units M12 to M18 of the printer driver M10 in the above-described exemplary embodiment may be implemented by the control circuit 212 of the printing apparatus 200. That is, the image processing may be executed in the control circuit 212 of the printing apparatus 200. In this case, the appearance of the edge in the printed image can be improved by the image processing in the printing apparatus 200.

(C-8) In the above-described exemplary embodiment, a part of the configurations implemented by hardware may be replaced with software. To the contrary, a part or all of the configurations implemented by the software may be replaced with hardware.

Although the invention has been described with reference to the exemplary and modified exemplary embodiments, the embodiments have been provided to easily understand the invention, not to limit the invention. The invention can be changed and modified without departing from the scope and the claims and includes the equivalents.

[FIG. 1]
M10: printer driver
M12: change processing unit
M14: halftone processing unit
M16: enlargement processing unit
M18: compression unit
120: internal storage device
130: external storage device
132: driver program
134: image data 170: operation unit
180: display unit
190: communication unit
212: control circuit
M20: apparatus control unit
250: printer engine
290: communication unit
214: volatile memory
216: non-volatile memory
270: operation unit
280: display unit
[FIG. 2]
Image Processing
S100: Acquire target image data
S200: Rasterizing processing
S300: Monochrome conversion processing
S400: Longitudinal reduction processing
S500: Halftone processing
S600: Longitudinal enlargement processing
S700: Compression processing
S800: Generate print data
S900: Transmit print data
[FIG. 4]
Compression Processing
S702: Select processing target line
S704: Same as previous processing target line?
S706: Generate 'OFF' reference flag data
S708: Generate compressed line data of processing target and data amount data
S710: Generate 'ON' reference flag data
S712: Are all lines selected?
[FIG. 5]
310A: reference flag OFF
320: data amount
330: compressed line data
310B: reference flag ON
320: data amount
330: compressed line data
310B: reference flag ON
first line, second line, third line, fourth line
[FIG. 11]
Image Processing
S100: Acquire target image data
S200: Rasterizing processing
S300: Monochrome conversion processing
S350A: Longitudinally long image?
S370A: 90° rotation processing
S400A: Lateral enlargement processing
S500: Halftone processing
S600: Longitudinal enlargement processing
S700: Compression processing
S800: Generate print data
S900: Transmit print data
[FIG. 13]
(A) Screen Angle of Dither Matrix Set
172.37°, 26.56°, 7.63°, 0°
(B) Screen Angle on Printed Image
165°, 45°, 15°, 0°

What is claimed is:

1. An image processing apparatus for a print execution unit that is configured to print a dot image, the image processing apparatus comprising:
a processor configured to operate as:
a change processing unit configured to execute change processing of changing a pixel-number ratio S of a second direction to a first direction for distortion-free image data expressing a distortion-free image having the pixel-number ratio S to acquire distorted image data expressing a distorted image having the pixel-number ratio of p×S, wherein S is more than zero and p is more than 1; and
a halftone processing unit configured to execute halftone processing for generating dot data, which expresses a formation state of a dot for each pixel, on the distorted image data having the pixel-number ratio of p×S by using a dither matrix so as to generate distorted dot data expressing a distorted dot image having the pixel-number ratio of p×S,
wherein the distorted dot data is used for printing a distortion-free dot image in the print execution unit, wherein the distortion-free dot image is to be obtained by enlarging the distorted dot data in at least the first direction, the distortion-free dot image having the pixel-number ratio S, and
wherein a screen angle of the dither matrix is set to be about $\arctan((\tan \theta)/p))$ when a screen angle in the distortion-free dot image is $\theta$.

2. The image processing apparatus according to claim 1,
wherein the processor is configured to further operate as:
an enlargement processing unit configured to execute enlargement processing on the distorted dot data to generate distortion-free dot data expressing the distortion-free dot image.

3. The image processing apparatus according to claim 2,
wherein the change processing unit is configured to execute the change processing of reducing the number of pixels in the first direction in the distortion-free image to (1/p), and
wherein the enlargement processing unit is configured to execute the enlargement processing of enlarging p times the number of pixels in the first direction in the distorted dot image.

4. The image processing apparatus according to claim 2,
wherein the change processing unit is configured to execute the change processing of enlarging p times the number of pixels in the second direction in the distortion-free image, and
wherein the enlargement processing unit is configured to execute the enlargement processing of enlarging p times the number of pixels in the first direction in the distorted dot image.

5. The image processing apparatus according to claim 2,
wherein the enlargement processing unit is configured to generate the distortion-free dot data expressing the distortion-free dot image comprising a plurality of sets of same lines,
wherein the set of the same lines comprises a set of two or more lines among a plurality of lines along the second direction configuring the distortion-free dot image, which two or more lines are adjacent to each other and have the same formation state of a dot of each composite pixel,
wherein the distortion-free dot data comprises compressed data expressing the set of the same lines, and
wherein the compressed data comprises:
representative line data expressing one representative line; and
data indicating that the representative line data repeats.

6. The image processing apparatus according to claim 2,
wherein the distortion-free dot data comprises a plurality of line data corresponding to each of lines along the second direction configuring the distortion-free dot image, wherein each line data comprises pixel values indicating the formation states of dots of a plurality of pixels configuring the corresponding line, wherein the enlargement processing unit is configured to generate the distortion-free dot data such that the generated distortion-free dot data comprises a plurality of sets of same line data, wherein the set of the same line data comprises the set of the two or more line data corresponding to two or more lines adjacent to each other and having the same pixel value of the respective composite pixels, and wherein the processor is configured to further operate as:
  a compression unit configured to compress the distortion-free dot data by converting the set of the same line data into a set of representative line data, which is one line data configuring the set of the same line data, and data indicating that the representative line data repeats.

7. The image processing apparatus according to claim 4, wherein the enlargement processing unit is configured to generate the distortion-free dot data expressing the distortion-free dot image comprising a plurality of sets of same lines, wherein the set of the same lines comprises a set of two or more lines among a plurality of lines along the second direction configuring the distortion-free dot image, which two or more lines are adjacent to each other and have the same formation state of a dot of each composite pixel, wherein the distortion-free dot data comprises compressed data expressing the set of the same lines, and wherein the compressed data comprises:
  representative line data expressing one representative line; and
  data indicating that the representative line data repeats.

8. The image processing apparatus according to claim 4, wherein the distortion-free dot data comprises a plurality of line data corresponding to each of lines along the second direction configuring the distortion-free dot image, wherein each line data comprises pixel values indicating the formation states of dots of a plurality of pixels configuring the corresponding line, wherein the enlargement processing unit is configured to generate the distortion-free dot data such that the generated distortion-free dot data comprises a plurality of sets of same line data, wherein the set of the same line data comprises the set of the two or more line data corresponding to two or more lines adjacent to each other and having the same pixel value of the respective composite pixels, and wherein the processor is configured to further operate as:
  a compression unit configured to compress the distortion-free dot data by converting the set of the same line data into a set of representative line data, which is one line data configuring the set of the same line data, and data indicating that the representative line data repeats.

9. The image processing apparatus according to claim 1, wherein the dither matrix is set such that a line interval appearing in the distorted dot image becomes about $(1/p) \times D \times \cos\phi / \cos\theta$ ($\phi = \arctan((\tan\theta)/p)$) when a line interval in the distortion-free dot image is D, and wherein the line interval is an interval of a plurality of dot lines along a direction of the screen angle.

10. An image processing apparatus for a print execution unit that is configured to print a dot image, the image processing apparatus comprising:

a processor configured to operate as:
  a change processing unit configured to execute change processing of changing a pixel-number ratio S of a second direction to a first direction for distortion-free image data expressing a distortion-free image having the pixel-number ratio S to acquire distorted image data expressing a distorted image having the pixel-number ratio of $p \times S$, wherein S is more than zero and p is more than 1;
  a halftone processing unit configured to execute halftone processing for generating dot data, which expresses a formation state of a dot for each pixel, on the distorted image data having the pixel-number ratio of $p \times S$ by using a dither matrix so as to generate distorted dot data expressing a distorted dot image having the pixel-number ratio of $p \times S$; and
  an enlargement processing unit configured to execute enlargement processing for the distorted dot data to generate distortion-free dot data expressing a distortion-free dot image, wherein the distortion-free dot image is to be obtained by enlarging the distorted dot image in at least the first direction, the distortion-free dot image having the pixel-number ratio S and comprising a plurality of sets of same lines, wherein the set of the same lines comprises a set of two or more lines among a plurality of lines along the second direction configuring the distortion-free dot image, which two or more lines are adjacent to each other and have the same formation state of a dot of each composite pixel, wherein the distortion-free dot data comprises compressed data expressing the set of the same lines, and wherein the compressed data comprises:
  representative line data expressing one representative line; and
  data indicating that the representative line data repeats.

11. A non-transitory computer-readable medium having an image processing program stored thereon and readable by a computer, the image processing program, when executed by the computer, causes the computer to implement functions comprising:

a change processing function of executing change processing of changing a pixel-number ratio S of a second direction to a first direction for distortion-free image data expressing a distortion-free image having the pixel-number ratio S to acquire distorted image data expressing a distorted image having the pixel-number ratio of $p \times S$, wherein S is more than zero and p is more than 1; and a halftone processing function of executing halftone processing for generating dot data, which expresses a formation state of a dot for each pixel, on the distorted image data having the pixel-number ratio of $p \times S$ by using a dither matrix so as to generate distorted dot data expressing a distorted dot image having the pixel-number ratio of $p \times S$, wherein the distorted dot data is used for printing a distortion-free dot image in a print execution unit configured to print a dot image, wherein the distortion-free dot image is to be obtained by enlarging the distorted dot data in at least the first direction, the distortion-free dot image having the pixel-number ratio S, and wherein a screen angle of the dither matrix is set to be about $\arctan((\tan\theta)/p)$ when a screen angle appearing in the distortion-free dot image is $\theta$.

12. The non-transitory computer-readable medium according to claim 11,
wherein the image processing program, when executed by the computer, causes the computer to implement functions comprising:
an enlargement processing function of executing enlargement processing on the distorted dot data to generate distortion-free dot data expressing the distortion-free dot image.

13. The non-transitory computer-readable medium according to claim 12,
wherein the change processing function executes the change processing of reducing the number of pixels in the first direction in the distortion-free image to (1/p), and
wherein the enlargement processing function executes the enlargement processing of enlarging p times the number of pixels in the first direction in the distorted dot image.

14. The non-transitory computer-readable medium according to claim 12,
wherein the change processing function executes the change processing of enlarging p times the number of pixels in the second direction in the distortion-free image, and
wherein the enlargement processing function executes the enlargement processing of enlarging p times the number of pixels in the first direction in the distorted dot image.

15. The non-transitory computer-readable medium according to claim 12,
wherein the enlargement processing function generates the distortion-free dot data expressing the distortion-free dot image comprising a plurality of sets of same lines,
wherein the set of the same lines comprises a set of two or more lines among a plurality of lines along the second direction configuring the distortion-free dot image, which two or more lines are adjacent to each other and have the same formation state of a dot of each composite pixel,
wherein the distortion-free dot data comprises compressed data expressing the set of the same lines, and
wherein the compressed data comprises:
representative line data expressing one representative line; and
data indicating that the representative line data repeats.

16. The non-transitory computer-readable medium according to claim 12,
wherein the distortion-free dot data comprises a plurality of line data corresponding to each of lines along the second direction configuring the distortion-free dot image,
wherein each line data comprises pixel values indicating the formation states of dots of a plurality of pixels configuring the corresponding line,
wherein the enlargement processing function generates the distortion-free dot data such that the generated distortion-free dot data comprises a plurality of sets of same line data,
wherein the set of the same line data comprises the set of the two or more line data corresponding to two or more lines adjacent to each other and having the same pixel value of the respective composite pixels, and
wherein the image processing program, when executed by the computer, causes the computer to implement functions comprising:
a compression function of compressing the distortion-free dot data by converting the set of the same line data into a set of representative line data, which is one line data configuring the set of the same line data, and data indicating that the representative line data repeats.

17. The non-transitory computer-readable medium according to claim 14,
wherein the enlargement processing function generates the distortion-free dot data expressing the distortion-free dot image comprising a plurality of sets of same lines,
wherein the set of the same lines comprises a set of two or more lines among a plurality of lines along the second direction configuring the distortion-free dot image, which two or more lines are adjacent to each other and have the same formation state of a dot of each composite pixel,
wherein the distortion-free dot data comprises compressed data expressing the set of the same lines, and
wherein the compressed data comprises:
representative line data expressing one representative line; and
data indicating that the representative line data repeats.

18. The non-transitory computer-readable medium according to claim 14,
wherein the distortion-free dot data comprises a plurality of line data corresponding to each of lines along the second direction configuring the distortion-free dot image,
wherein each line data comprises pixel values indicating the formation states of dots of a plurality of pixels configuring the corresponding line,
wherein the enlargement processing function generates the distortion-free dot data such that the generated distortion-free dot data comprises a plurality of sets of same line data,
wherein the set of the same line data comprises the set of the two or more line data corresponding to two or more lines adjacent to each other and having the same pixel value of the respective composite pixels, and
wherein the image processing program, when executed by the computer, causes the computer to implement functions comprising:
a compression function of compressing the distortion-free dot data by converting the set of the same line data into a set of representative line data, which is one line data configuring the set of the same line data, and data indicating that the representative line data repeats.

19. The non-transitory computer-readable medium according to claim 11,
wherein the dither matrix is set such that a line interval appearing in the distorted dot image becomes about $(1/p) \times D \times \cos \phi / \cos \theta$ ($\phi = \arctan((\tan \theta)/p)$) when a line interval in the distortion-free dot image is D, and
wherein the line interval is an interval of a plurality of dot lines along a direction of the screen angle.

20. A non-transitory computer-readable medium having an image processing program stored thereon and readable by a computer, the image processing program, when executed by the computer, causes the computer to implement functions comprising:
a change processing function of executing change processing of changing a pixel-number ratio S of a second direction to a first direction for distortion-free image data expressing a distortion-free image having the pixel-number ratio S to acquire distorted image data expressing a distorted image having the pixel-number ratio of $p \times S$, wherein S is more than zero and p is more than 1;
a halftone processing function of executing halftone processing for generating dot data, which expresses a formation state of a dot for each pixel, on the distorted image data having the pixel-number ratio of p×S by using a dither matrix so as to generate distorted dot data expressing a distorted dot image having the pixel-number ratio of p×S; and an enlargement processing function of executing enlargement processing for the distorted dot data to generate distortion-free dot data expressing a distortion-free dot image, wherein the distortion-free dot image is to be obtained by enlarging the distorted dot image in at least the first direction, the distortion-free dot image having the pixel-number ratio S, comprising a plurality of sets of same lines and being used for a printing operation of a print execution unit configured to print a dot image, wherein the set of the same lines comprises a set of two or more lines among a plurality of lines along the second direction configuring the distortion-free dot image, which two or more lines are adjacent to each other and have the same formation state of a dot of each composite pixel, wherein the distortion-free dot data comprises compressed data expressing the set of the same lines, and wherein the compressed data comprises:
  representative line data expressing one representative line; and
  data indicating that the representative line data repeats.

* * * * *